United States Patent

[11] 3,598,450

| [72] | Inventors | Raymond Clarence Brown<br>Tarzana;<br>Phillip Cravits, Burbank; Charles Pelly,<br>Los Angeles, all of, Calif. |
|---|---|---|
| [21] | Appl. No. | 853,651 |
| [22] | Filed | Aug. 28, 1969 |
| [45] | Patented | Aug. 10, 1971 |
| [73] | Assignee | Superior Industries, Inc.<br>Van Nuys, Calif. |

[54] VEHICLE WHEEL AND WHEEL CAP ASSEMBLY
3 Claims, 3 Drawing Figs.

| [52] | U.S. Cl. | 301/108 R |
|---|---|---|
| [51] | Int. Cl. | B60b 7/06 |
| [50] | Field of Search | 301/108, 37; 308/187.1, 16, 96 |

[56] References Cited
UNITED STATES PATENTS

| 2,486,270 | 10/1949 | Fawick | 308/187.1 |
| 3,126,232 | 3/1964 | Reilly | 308/187.1 X |
| 3,395,950 | 8/1968 | Brandt | 308/187 |

FOREIGN PATENTS

| 524,462 | 5/1931 | Germany | 301/108 |

Primary Examiner—Richard J. Johnson
Attorney—Fulwider, Patton, Rieber, Lee & Utecht ABSTRACT: A vehicle wheel and wheel cap assembly in which the wheel cap constitutes an aesthetically attractive axial extension of the central hub of the wheel, the external surface of the cap forming a faired continuation of the adjacent surface of the wheel hub. The wheel and cap are releasably secured together by a resilient annular member carried within confronting grooves formed in faying surfaces of the wheel and cap.

PATENTED AUG 10 1971   3,598,450
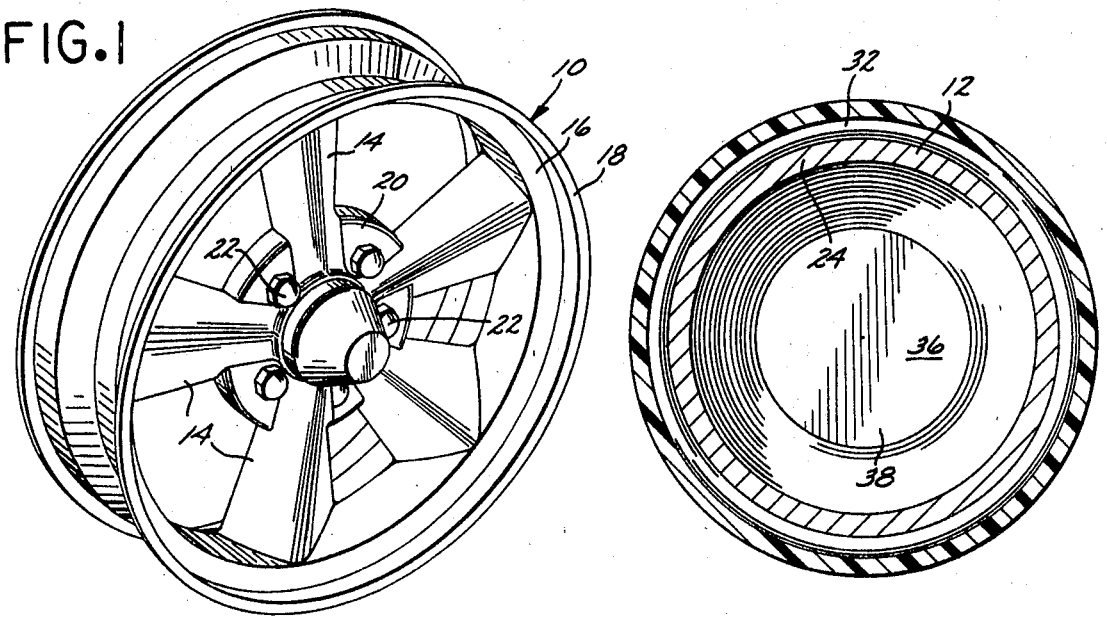
FIG.1
FIG.3
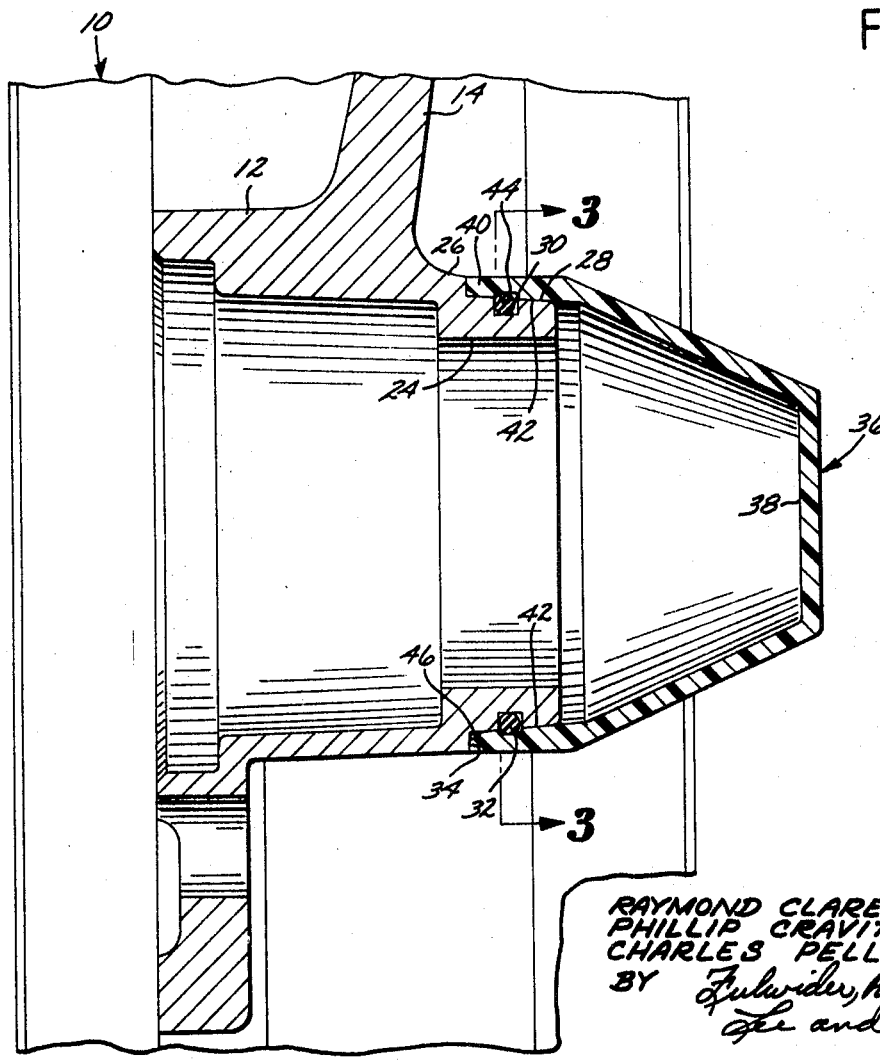
FIG.2
INVENTORS.
RAYMOND CLARENCE BROWN
PHILLIP CRAVITS
CHARLES PELLY
BY Fulwider, Patton, Rieber,
Lee and Utecht
ATTORNEYS

3,598,450

VEHICLE WHEEL AND WHEEL CAP ASSEMBLY

BACKGROUND OF THE INVENTION

1. Field of the Invention

The present invention relates to a vehicle wheel and wheel cap assembly particularly adapted for use with sports car wheels.

2. Description of the Prior Art

Sports car wheels are usually made of aluminum or magnesium alloy hub and spoke center sections suitably attached to a chrome steel rim. A typical wheel includes a central opening to permit the wheel to fit over the vehicle axle, and a plurality of holes are provided around the central opening to enable the wheel to be bolted to the brake drum. The wheel spokes are carefully designed to present a pleasing appearance, being smoothly curved to nicely merge with the contours of the rim and the hub portion.

In this prior art construction the hub portion is capped by an element which includes a number of circumferentially arranged mounting lugs to keep the element from coming off the hub portion during travel of the vehicle over rough roads, for example. Each lug is separately bolted to the wheel hub. Consequently, the attractive lines of the wheel are undesirably spoiled by the prominently located mounting bolts for the cap element.

SUMMARY

According to the present invention, a vehicle wheel and wheel cap assembly is provided which is releasably held together by a resilient annular member carried within confronting grooves formed in faying surfaces of the wheel and cap. No mounting lugs and bolts spoil the "clean" design appearance of the assembly, the annular member being sufficiently resistant to deformation that deliberate effort is required to separate the cap from the wheel. Indeed, the deformation characteristic of the annular member may be selected such that removal of the cap would be very difficult, if not impossible, without the use of some form of prying tool inserted between the wheel and cap.

The configuration of the wheel and cap smoothly fair into one another, with the means for attaching the two, that is, the annular member, being completely concealed. Moreover, assembly of the two components is quickly and easily accomplished by simply forcibly pressing the cap against the wheel hub until the resilient annular member is properly seated.

BRIEF DESCRIPTION OF THE DRAWING

FIG. 1 is a perspective view of a vehicle wheel, including the wheel and wheel cap assembly of the present invention;

FIG. 2 is an enlarged partial transverse cross sectional view of the wheel and wheel cap assembly of FIG. 1; and FIG. 3 is a view taken along the line 3-3 of FIG. 2.

DESCRIPTION OF THE PREFERRED EMBODIMENT

Referring now to the drawing, there is illustrated a vehicle or sports car wheel 10 of the type which includes a cast aluminum or magnesium alloy center section having a central wheel hub 12 and a plurality of radiating spokes 14. The spokes 14 are integral at their inner extremities with the hub 12 and are integral at their outer extremities with a circumferential flange 16 which is pressed fitted within and suitably secured to a chrome steel rim 18. The rim 18 is adapted to mount a usual pneumatic tire (not shown).

The hub 12 includes a web section 20 having a plurality of openings which received a plurality of mounting studs 22 for securement of the wheel 10 to the brake drum (not shown) of the vehicle, as will be apparent to those skilled in the art.

The primary purpose of the design just described is to present a wheel of pleasing, "sporty" appearance, and particularly one that is attractive to sports car enthusiasts. Of course, the structure must necessarily be strong and structurally well designed, but the main appeal of the wheel is its appearance.

In this regard, the hub 12 is generally cylindrical and characterized by a cylindrical, centrally located opening 24 adapted to receive the projecting extremity of the vehicle wheel axle (not shown). The hub 12 includes an annular outer surface 26 which is a generally axially extending surface smoothly faired into generally radially oriented surfaces of the spokes 14 and the web section 20, as best viewed in FIG. 2. The surface 26 extends circumferentially of the central opening 24.

Axially outwardly of the surface 26, that is, to the right as viewed in FIG. 2, the hub 12 is characterized by a reduced diameter, slightly tapered annular surface 28 which extends generally axially. The surface 28 includes an annular depression, seat, or groove 30 within which is seated a resilient annular member or O-ring 32 made of a suitable elastomeric material.

The juncture of the surfaces 26 and 28 defines a circumferential shoulder 34.

The central opening 24 in the wheel hub 12 is closed by an overlying hollow wheel cap 36 of generally frustoconical configuration to accommodate the projecting end of the wheel axle (not shown). The outer extremity of the cap 36 is closed by an end wall 38, to which may be applied any decorative insignia (not shown). The inner extremity of the cap 36 comprises a cylindrical skirt 40 having a tapered circumferentially oriented surface 42 which is provided with an annular depression, seat, or groove 44.

The tapered surfaces 28 and 42 are in faying relation, with the grooves 30 and 44 in confronting relation, so that the O-ring 32 is seated within the groove 44 as well as the groove 30.

The inner edge of the skirt 40 is provided at its inner margin with a radius 46 to facilitate initial fitting of the cap 36 over the projecting edge margin of the hub 12. Once located properly, an axial push against the cap 36 is sufficient to enable the radius 46 to slide over and deform the O-ring 32, which is located in the groove 30, to permit the O-ring 32 to thereafter also seat in the groove 44. In this arrangement of the components, the inner edge or terminus of the cap 36 abuts or bottoms out against the shoulder 34.

It is particularly noted that the adjacent circumferential outer surfaces of the hub 12 and cap 36 form a pleasing, smoothly faired continuation of one another, without the unattractive presence of any fastening screws or bolts.

The resilience and size of the O-ring 32 is sufficient to prevent accidental separation of the cap 36 from the hub 12, and one desiring to remove the cap 36 must necessarily pry off the cap 36 in an axial direction. This discourages theft.

From the foregoing it will be apparent that the present wheel 10 and wheel cap 36 provide a quickly connected assembly which is aesthetically pleasing in appearance, and which is adapted for ready separation by any suitable prying tool. The assembly also enables a variety of designs of wheel cap 36 to be used with each wheel 10, so long as the grooves 30 and 44 thereof are complemental.

Various modifications and changes may be made with regard to the foregoing detailed description without departing from the spirit of the invention.

We claim:

1. A vehicle wheel and wheel cap assembly comprising:
    a vehicle wheel including a centrally located opening adapted to receive the projecting extremity of the vehicle wheel axle, said wheel further including a central hub having an annular outer surface and a reduced diameter, generally axially extending annular first surface forming a continuation of said outer surface and thereby defining a shoulder with said outer surface, said first surface having an annular first groove;
    a wheel cap including a cylindrical skirt adapted to overlie said wheel axle and having an axially inwardly located terminus in abutment with said shoulder, and having an axially inwardly located, circumferential outer surface forming a smoothly faired continuation of said outer surface of said central hub, and further having an annular second surface, said second surface having an annular second groove, said first and second surfaces being arranged in faying relation with said first and second grooves in confronting relation; and means disposed in said first and second grooves and constraining said wheel and wheel cap against axial separation, said means being resiliently deformable within said first and second grooves whereby said wheel and wheel cap may be axially separated with deliberately applied force.

2. A vehicle wheel and wheel cap assembly according to claim 1 wherein said means comprises an O-ring made of elastomeric material.

3. A vehicle wheel and wheel cap assembly according to claim 1 wherein the extremity of said wheel cap opposite said inwardly located terminus is closed.